United States Patent [19]

Martinez et al.

[11] Patent Number: 4,689,314

[45] Date of Patent: Aug. 25, 1987

[54] METHOD OF PREPARATION OF MILD HYDROCRACKING CATALYST FOR THE PRODUCTION OF MIDDLE DISTILLATES

[75] Inventors: Nelson P. Martinez; Roberto E. Galiasso, both of San Antonio de Los Altos; Jose R. Velasquez, Caracas; Juan Lujano, Caracas; Carlos Zerpa, Caracas, all of Venezuela

[73] Assignee: Intevep, S.A., Caracas, Venezuela

[21] Appl. No.: 859,506

[22] Filed: May 5, 1986

[51] Int. Cl.$^4$ .................... B01J 27/182; B01J 27/185; B01J 27/188

[52] U.S. Cl. .................................................. 502/210

[58] Field of Search ............................... 502/210, 211

[56] References Cited

U.S. PATENT DOCUMENTS 3,817,873 6/1974 Mickelson ...................... 502/210 X
4,134,856 1/1979 Itoh et al. ....................... 502/211 X Primary Examiner—W. J. Shine
Attorney, Agent, or Firm—Bachman & LaPointe

[57] ABSTRACT

A catalyst having a surface concentration as measured by X-Ray Photoelectronic Spectroscopy (XPS) gives values of the Group VIB metal $X_s/(Al+X)_s$ of between 4 to 15 where X equals the Group VIB metal and a bulk concentration of between 2.0 to 15.0 wt. % of said Group VIB metal, a surface concentration as measured by X-Ray Photoelectronic Spectroscopy (XPS) gives values of the Group VIII metal $Y_s/(Al+Y)_s$ of between 2 to 5 where Y equals the Group VIII metal and a bulk concentration of between 1.0 to 4 wt. % of said Group VIII metal, a surface concentration as measured by X-Ray Photoelectronic Spectroscopy (XPS) gives values of phosphorus $P_s/(Al+P)_s$ of between 0.1 to 8 and a bulk concentration of between 0.4 to 2 wt. % phosphorus and a surface concentration as measured by X-Ray Photoelectronic Spectroscopy (XPS) gives values of silica $SiO_2/(Al+SiO_2)$ of between 1 to 10 and a bulk concentration of between 0.1 to 5 wt. % silica and method for preparation of same.

5 Claims, 7 Drawing Figures

PREPARATION OF SURFACE SILICA ALUMINA CATALYST OF THE PRESENT INVENTION

CAT I AND II

PREPARATION OF CONVENTIONAL SILICA-ALUMINA CATALYTIC SUPPORTS BY CONDENSATION OF ALUMINUM TRIHYDRATE WITH THE SURFACE OF A SILICA HYDROGEL PARTICLE.

X-RAY DIFFRACTION OF THE PSEUDOBOEHMITE ALUMINA USE AS SUPPORT

DRS OF CATALYSTS I II III AND IV

FIG-5 DRX (X-Ray Diffraction) of Catalyst II and III

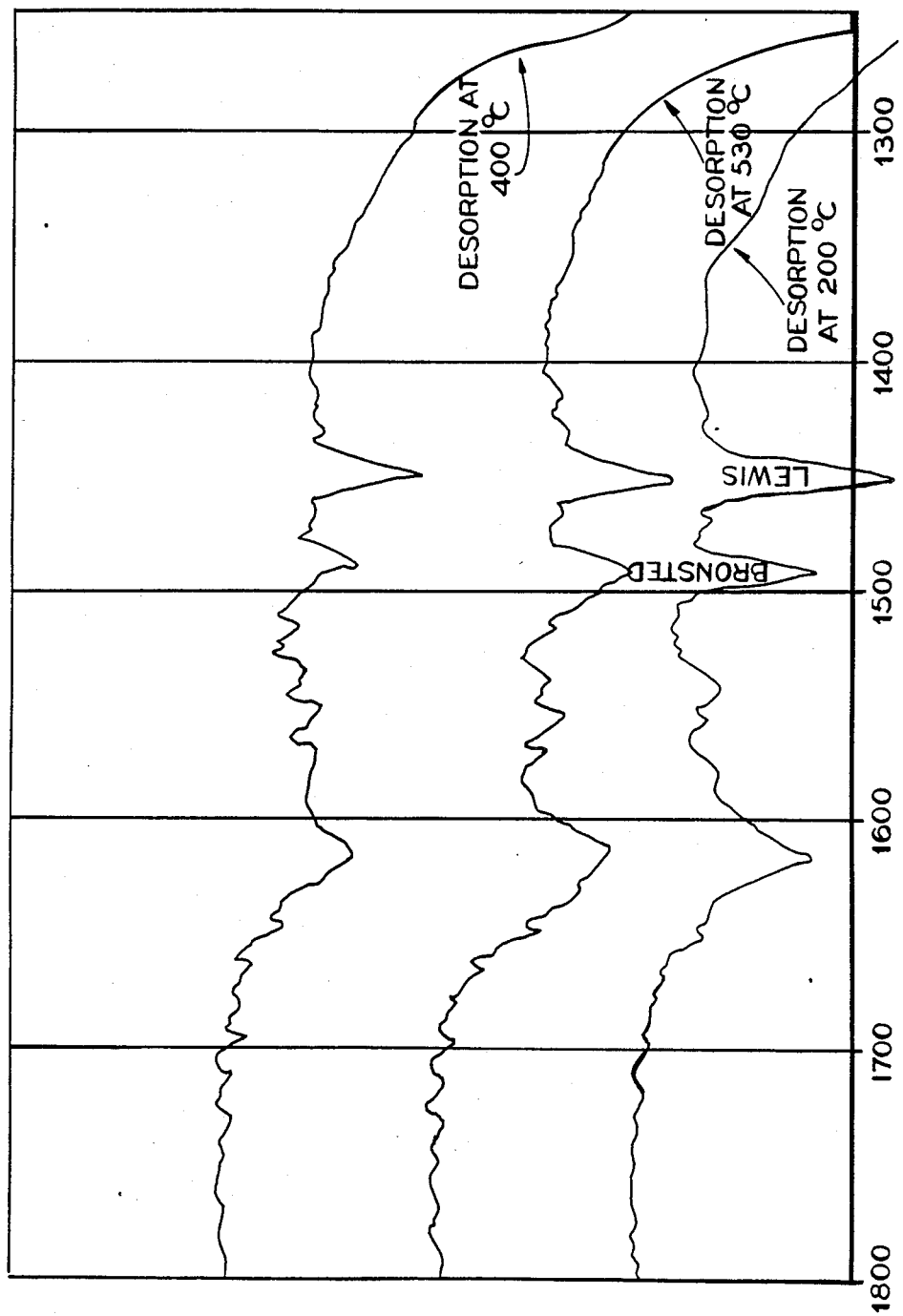

METHOD OF PREPARATION OF MILD HYDROCRACKING CATALYST FOR THE PRODUCTION OF MIDDLE DISTILLATES

BACKGROUND OF THE INVENTION

The present invention relates to a catalyst for use in the hydrocracking of a heavy hydrocarbon feedstock so as to increase cracking activity and obtain high quality middle distillate products boiling in the range of about between 300° F. to 700° F. and a method for the preparation of the catalyst and a process for the treatment of a heavy hydrocarbon feedstock with the catalyst.

In the petroleum industry there is a great interest in converting conventional HDS plants into mild hydrocracking plants. This interest is mainly due to the increase in demand of high quality middle distillate products boiling in about the range of 300° F. to 700° F. These high quality middle distillate products include, for example, aviation turbine fuels, diesel fuels, heating oils, solvents and the like. In order to meet the growing demand for high quality middle distillate products it is desirable to complement the distillation and catalytic cracking operations with catalytic hydrocracking.

Heretofore, most investigations on catalytic hydrocracking have been oriented towards production of lower boiling point products such as gasoline. In known processes it has been necessary to prepare very active catalysts which are normally obtained from a crystalline hydrogen Y zeolite base or silica-alumina base upon which is deposited suitable hydrogenation metal components. The type of catalyst as mentioned above cannot readily be used for the conversion of heavy gas oils boiling above 700° F. for middle distillate production because of significant changes in selectivity. The foregoing catalysts are generally used under severe conditions and under these conditions with a heavy feedstock a large portion of the feed is converted to products boiling below 400° F.

Attempts to use conventional HDS cobalt-molybdate catalysts, which are known to have some moderate cracking activity, under hydrocracking conditions to obtain a more selective conversion of heavy feeds to middle distillate products, improved selectivity and cracking activity have been unsuccessful. For example, U.S. Pat. No. 3,853,742 discloses the addition of small amounts of zeolite to a hydrorefining catalyst of the type set forth above to improve activity. While the addition of zeolite improved catalyst activity, selectivity of the catalyst was sacrificed. U.S. Pat. No. 3,306,843 discloses incorporating silica gel into a catalyst in order to improve cracking activity. Again, the cracking activity improved at the expense of selectivity of the catalyst which was drastically reduced. Other examples of mild hydrocracking catalysts of the type known in the prior art are U.S. Pat. Nos. 4,396,500, 3,755,150, 3,287,280 and 3,232,887 wherein an active phase of nickel, molybdenum and phosphorus is impregnated on a gamma alumina support. Finally, hydrocracking catalysts based on zeolites are disclosed in U.S. Pat. Nos. 3,897,327, 3,506,400, 3,513,108, 3,354,077, 3,449,070 and 3,293,192. While the foregoing prior art catalysts offer some improvement in cracking activity, they do not meet the overall criteria of increasing cracking activity so as to obtain high quality middle distillate products boiling in the range of 300° F. to 700° F.

Accordingly, it is a principal object of the present invention to provide an improved catalyst for the mild hydrocracking of heavy vacuum gas oils.

It is a particular object of the present invention to provide an improved catalyst for use in the mild hydrocracking of heavy hydrocarbon feedstocks wherein the surface of the catalyst is characterized by a silica-alumina material having textural and crystallographic properties substantially similar to the alumina carrier.

It is a further object of the present invention to provide a catalyst as aforesaid wherein the bulk of the catalyst is substantially free of silicon.

It is a still further object of the present invention to provide a method for preparing a catalyst used in the hydrocracking of hydrocarbon feedstocks by contacting the catalyst with a solution of water soluble organosiloxanes in a phosphoric acid solution.

It is a still further object of the present invention to provide a process for the treatment of heavy hydrocarbon feedstocks with a catalyst.

Further objects and advantages will appear hereinbelow.

SUMMARY OF THE INVENTION

In accordance with the present invention the foregoing objects and advantages are readily obtained.

The present invention relates to a catalyst for use in the hydrocracking of a heavy hydrocarbon feedstock so as to increase cracking activity and obtain high quality middle distillate products boiling in the range of about 300° F. to 700° F. and, in particular, a method for the preparation of the catalyst and the process for the treatment of hydrocarbon feedstocks with the catalyst.

The catalyst comprises a metallic component selected from Group VIB of the Periodic Table, a metallic component selected from Group VIII of the Periodic Table, phosphorus and silica. In accordance with the particular feature of the present invention, the chemical composition of the catalyst comprises a surface concentration as measured by X-Ray Photoelectronic Spectroscopy (XPS) gives values of the Group VIB metal $X_s/(Al+X)_s$ of between 4 to 15 where X equals the Group VIB metal and a bulk concentration of between 2.0 to 15.0 wt. % of said Group VIB metal, a surface concentration as measured by X-Ray Photoelectronic Spectroscopy (XPS) gives values of the Group VIII metal $Y_s/(Al+Y)_s$ of between 2 to 5 where Y equals the Group VIII metal and a bulk concentration of between 1.0 to 4 wt. % of said Group VIII metal, a surface concentration as measured by X-Ray Photoelectronic Spectroscopy (XPS) gives values of phosphorus $P_s/(Al+P)_s$ of between 0.1 to 8 and a bulk concentration of between 0.4 to 2 wt. % phosphorus and a surface concentration as measured by X-Ray Photoelectronic Spectroscopy (XPS) gives values of silica $SiO_2/(Al+SiO_2)$ of between 1 to 10 and a bulk concentration of between 0.1 to 5 wt. % silica. In accordance with the method for preparing the catalyst of the present invention, the catalyst of the present invention is characterized by a silica-alumina material having textural and crystallographic qualities substantially similar to the alumina carrier. In addition to the foregoing, the catalyst of the present invention has a ratio of Bronsted type acid centers to Lewis type centers of between 1.0 to 2.5 as measured by pyridine adsorption. Finally, the surface structure of the catalyst of the present invention is characterized by a large amount of Group VIII element tetrahedral sites as measured by diffuse reflectance spectroscopy and no crystalline silica compound as measured by X-ray diffraction. In accordance with the method of the present invention, the alumina carrier is contacted with a water soluble organosiloxane solution in phosphoric acid at a pH of about 1.5 to 3.5.

In accordance with the present invention the silica gel can be incorporated onto the surface of a controlled porosity alumina base carrier to give a more acidic support without sacrificing the dispersion of the components of the hydrogenation active phase thereby improving cracking activity and selectivity of conversion of heavy feedstocks to middle distillate products. In accordance with the method of the present invention, the silica-alumina surface is created under controlled conditions onto the surface of the alumina base by contacting the material with organo-compounds of silica. The resulting alumina base provides a matrix with controlled textural properties and the surface of silica-alumina provides the desired increase in cracking activity. The bulk of the alumina carrier is substantially free of silica.

BRIEF DESCRIPTION OF THE DRAWINGS

FIG. 7 illustrates the results of a pyridine adsorption test indicating the ratio of Bronsted to Lewis centers of the catalyst of the present invention.

DETAILED DESCRIPTION

Figure 1:
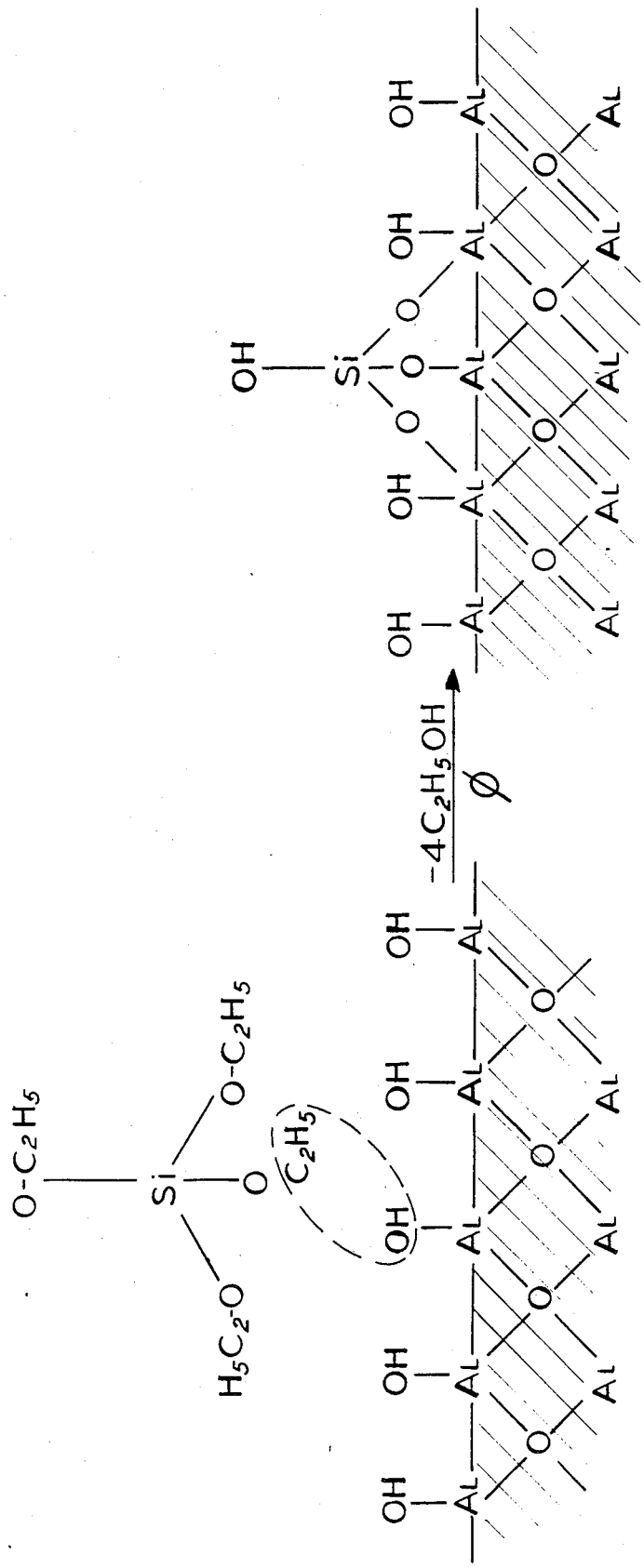
FIG. 1 shows the surface characteristics of the catalyst of the present invention prepared in accordance with the method of the present invention.
Figure 2:
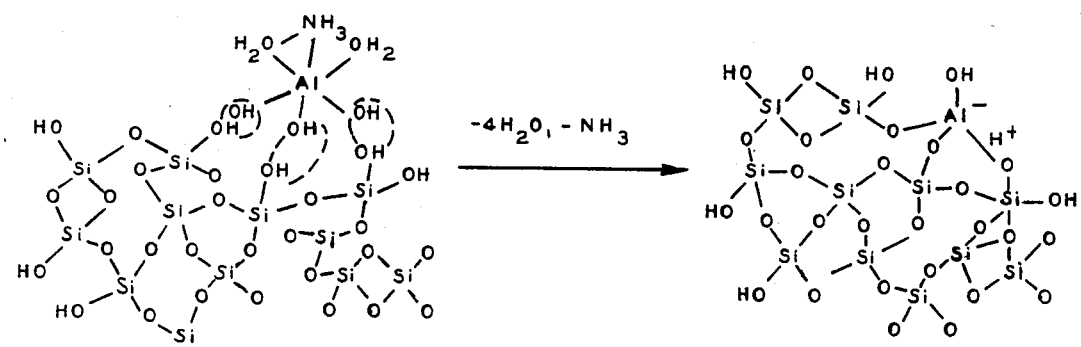
FIG. 2 shows a conventional silica-alumina catalyst support prepared by the condensation of aluminum trihydrate with the surface of a silica hydrogel particulate.

The catalyst of the present invention is prepared by contacting an alumina carrier with at least one component selected from the metallic elements of Group VIB of the Periodic Table so as to obtain a surface concentration as measured by X-Ray Photoelectronic Spectroscopy (XPS) gives values $Xs/(Al+X)s$ of between 4 to 15 where X equals the Group VIB metal and a bulk concentration of between 2.0 to 15.0 wt. % of the element, at least one component selected from the metallic elements of Group VIII of the Periodic Table so as to obtain a surface concentration as measured by X-Ray Photoelectronic Spectroscopy (XPS) gives values $Ys/(Al+Y)s$ of between 2 to 5 where Y equals the Group VIII metal and a bulk concentration of between 1.0 to 4 wt. % of said element, phosphorus so as to obtain a surface concentration as measured by X-Ray Photoelectronic Spectroscopy (XPS) gives values $Ps/(Al+P)s$ of between 0.1 to 8 and a bulk concentration of between 0.4 to 2 wt. % and silica so as to obtain a surface concentration as measured by X-Ray Photoelectronic Spectroscopy (XPS) gives values $SiO_2/(Al+SiO_2)$ of between 1 to 10 and a bulk concentration of between 0.1 to 5 wt. %. In accordance with the present invention, the catalyst surface is characterized by a silica-alumina material having textural and crystallographic properties substantially similar to the alumina carrier. In addition, the ratio of Bronsted to Lewis centers on the surface of the catalyst is between 1.0 to 2.5 as measured by pyridine adsorption. Finally the surface of the catalyst has a large amount of Group VIII element tetrahedral sites as measured by diffraction reflectance sprectroscopy and substantially no crystalline silica compounds as measured by X-ray diffuse techniques. The chemical surface composition of the catalyst may also include sulfur in a total concentration of between 0.1 to 15 wt. % and a surface concentration as measured by X-Ray Photoelectronic Spectroscopy (XPS) gives values $S/(Al+S)$ of between 0.1 to 0.2.

The catalyst of the present invention is produced by contacting an alumina carrier having a surface area of between 100 to 200 square meters per gram and a pore volume of between 0.4 to 1.0 cubic centimeters per gram and a pore volume contribution of 75% in the range of 60 to 150 Å. The carrier is contacted with a solution containing a Group VIB element, Group VIII element, phosphorus and silica. In accordance with the preferred embodiment of the present invention the carrier is contacted with a phosphoric acid solution including water soluble organosiloxanes of between 1.5 to 3.5 pH. The alumina carrier is thereafter dried in air at a temperature below 50° C. for a period of 1 to 24 hours at a drying rate of 0.5 kilograms of water per hour. The dried catalyst is thereafter calcined in air at a temperature of between 200° to 300° C. to decompose the polymers present in the surface for a period of between 1 to 24 hours followed by a second treatment of between 400° to 550° C. in air during a period of time between 1 to 24 hours to adjust the balance of Bronsted to Lewis centers ratio between 1.0 and 2.5 as measured by pyridine adsorption. The calcined catalyst may then be sulphided in a gaseous stream of hydrogen and hydrogen sulfide in a molar ratio of 10 to 1 at a temperature of 250° to 330° C. for a period of 1 to 24 hours.

The alumina carrier may be formed in particle diameters of 1/32" to ⅛" by extrusion so as to obtain the surface area and pore volume set forth above.

The catalyst is used in a mild hydrocracking process so as to obtain high quality middle distillate products boiling in the range of about between 300° F. to 700° F. The particular hydrocarbon feed is a heavy hydrocarbon feedstock containing more than 50% by weight aromatics, more than 500 ppm nitrogen, more than 400 ppm sulfur, more than 0.4% Conradson Carbon and more than 0.5% of volume distilling at a temperature of greater than 520° C. The catalyst is used in a proportion higher than 5% by weight with respect to the hydrocarbon feedstock. The catalyst is operated at a temperature of between 340° to 430° C., at a pressure of between 500 to 1500 psig, a space velocity of between 0.3 to $2h^{-1}$ and hydrogen to hydrocarbon ratio of between 80 to 1000 N1/1. The catalyst is contacted with the feedstock and hydrogen and produces a 370° C. +conversion higher than 20% for a period of time greater than 14 months operating at constant or variable temperature.

The effectiveness of the present invention will be illustrated hereinbelow by way of the following examples.

EXAMPLE 1

Four catalysts were prepared for use in comparative trials. Catalyst 1 representing a typical prior art hydrorefining catalyst, was prepared by impregnating 1/16" diameter gamma alumina extrudates with a solution of nickel-nitrate and ammonium heptamolybdate. The catalyst was then dried and calcined in accordance with known prior art techniques. Catalyst 2, another prior art catalyst, was prepared by impregnating a $SiO_2$-$Al_2O_3$ (30/70) support as 1/16" diameter extrudates with a solution of nickel nitrate and ammonium heptamolybdate. The silica-alumina base was copregnated by adding sodium silicate to an alumina hydroxide. The catalyst was then dried and calcined in accordance with known prior art techniques. A heterogeneous catalyst of the present invention, Catalyst 3, was prepared as follows. Alumina support having a pore volume of 0.5 cc/g, surface area 150 m²/g and a pore volume contribution of 75% in the range of 60 to 150 Å was impregnated with a solution containing silicon tetraetoxisiloxane, nickel nitrate and ammonium heptamolybdate phosphoric acid and thereafter dried and calcined. Catalyst 4 representing a further catalyst of the present invention was prepared by coextrusion. In this case, the boehmite precursor of the gamma alumina carrier was peptized with a solution containing silicon, tetraetoxisiloxane, nickel nitrate and ammonium heptamolybdate phosphoric acid to form an extrudate paste which was then formed into cylindrical extrudates of 1/16" diameter and thereafter dried and calcined. Table I below shows the chemical composition of the catalysts.

TABLE I

| COMPOSITION wt. % | CATALYST 1 | CATALYST 2 | CATALYST 3 | CATALYST 4 |
| --- | --- | --- | --- | --- |
| NiO | 4.5 | 4.3 | 4.3 | 4.5 |
| $MoO_3$ | 16 | 16.5 | 16 | 16 |
| $P_2O_5$ | — | — | 5 | — |
| $SiO_2$ | — | — | 5 | 5 |

Tests on the catalytic activity in the mild hydrocracking of heavy feedstocks to obtain high quality middle distillate products was carried out using a Venezuela vacuum gas oil having the properties set forth below in Table II.

TABLE II

| API gravity, 60° F. | 17.4 |
| --- | --- |
| CCR, % p | 0.15 |
| Asphaltenes, % p | 0.07 |
| Total $N_2$, ppm | 1224 |
| S, % p | 2.17 |
| 270° C.⁻ | 1 |
| 270–370 | 19 |
| 370⁺ | 80 |

The processing conditions were as follows: temperature equals between 716° and 770° F., pressure equals 750 psig, LHSV equals 1 h⁻¹ and an $H_2$/feed equal to 300 Nm³/M³. Table III shows the results obtained with Catalysts 1, 2, 3 and 4.

TABLE III

| CATALYST | CONVERSION 370⁺ | HDS, % | HDN, % | CCR CONTENT |
| --- | --- | --- | --- | --- |
| 1 | 28 | 97 | 50.6 | 0.95 |
| 2 | 33 | 91.5 | 58.3 | 0.85 |
| 3 | 45 | 98.5 | 77.9 | 0.06 |
| 4 | 46.5 | 98.3 | 78.4 | 0.06 |

As can be seen from Table III Catalysts 3 and 4 representing the catalyst of the present invention show a substantial increase in HDS and HDN catalytic activities and in the conversion of Conradson Carbon over Catalysts 1 and 2 of the prior art. In addition, and more importantly, the conversion of the fractions 370⁺, that is, selectivity of conversion to middle distillates is far superior with the catalysts of the present invention (Catalysts 3 and 4) as compared to the prior art catalysts (Catalysts 1 and 2).

EXAMPLE 2

Catalysts 1, 2 and 3 were again tested for catalytic activity treating heavy hydrocarbon feedstocks having the properties set forth below in Table IV.

TABLE IV

| | Feed I | Feed II |
| --- | --- | --- |
| Gravity (API°) | | |
| Viscosity cst 140° F. | 16.3 | 19 |
| S wt. % | 2.23 | 2.1 |
| Nitrogen ppm | 1257 | 2155 |
| Basic nitrogen ppm | 330 | 715 |
| Aromatics wt. % | 62.18 | 71.15 |
| Polyaromatics wt. % | 33 | 49.0 |
| Conradson Carbon | 0.20 | 0.38 |
| ASTM Distillation T. °C. | | |
| 270° C. | 1.0 | — |
| 270–370° C. | 17 | 8 |
| 370° C.⁺ | 82 | 92.0 |
| % of cracked product | 0 | 35 |

The catalyst was operated at 400° C. at a pressure of 700 psig and a space velocity of 0.5 h⁻¹. Table V below shows the results obtained with Catalysts 1, 2 and 3 on both feedstocks.

TABLE V

| | CATALYST 1 Feedstock | | CATALYST 2 Feedstock | | CATALYST 3 Feedstock | |
| --- | --- | --- | --- | --- | --- | --- |
| | 1 | 2 | 1 | 2 | 1 | 2 |
| Sulphur removal wt. % | 73 | 60 | 75 | 59 | 85 | 80 |
| Nitrogen removal wt. % | 30 | 25 | 28 | 20 | 50 | 40 |
| 370° C.⁺ conversion wt. % | 26 | 19 | 30 | 19 | 48 | 24 |
| Aromatic hydrogenation wt. % | 10 | 05 | 13 | 07 | 15 | 12 |

As can be seen from Table V the catalyst of the present invention has a higher conversion than the catalysts of the prior art. In addition, the catalyst of the present invention is able to convert more nitrogen, 370° C.⁺ and aromatic hydrogenation product using Feed 2 which is more aromatic and has a higher nitrogen content than Feed 1. Furthermore, the 370° C.⁺ conversion difference between the catalysts is more noticeable for a heavy hydrocarbon feed. In addition to the foregoing, the stability of the catalyst of the present invention is greater than that of the prior art catalyst. When the final temperature of the operation is to be 415° C. and the sulfur content in the product must be below 0.2 wt. % the catalyst of the present invention is able to convert 20% more barrels of Feed 1 than the catalysts of the prior art (7 barrels per pound as compared with 5 barrels per pound).

EXAMPLE 3

The catalysts studied in previous examples were characterized using conventional techniques described in the literature in order to show the main properties of our invention.

Figure 3:
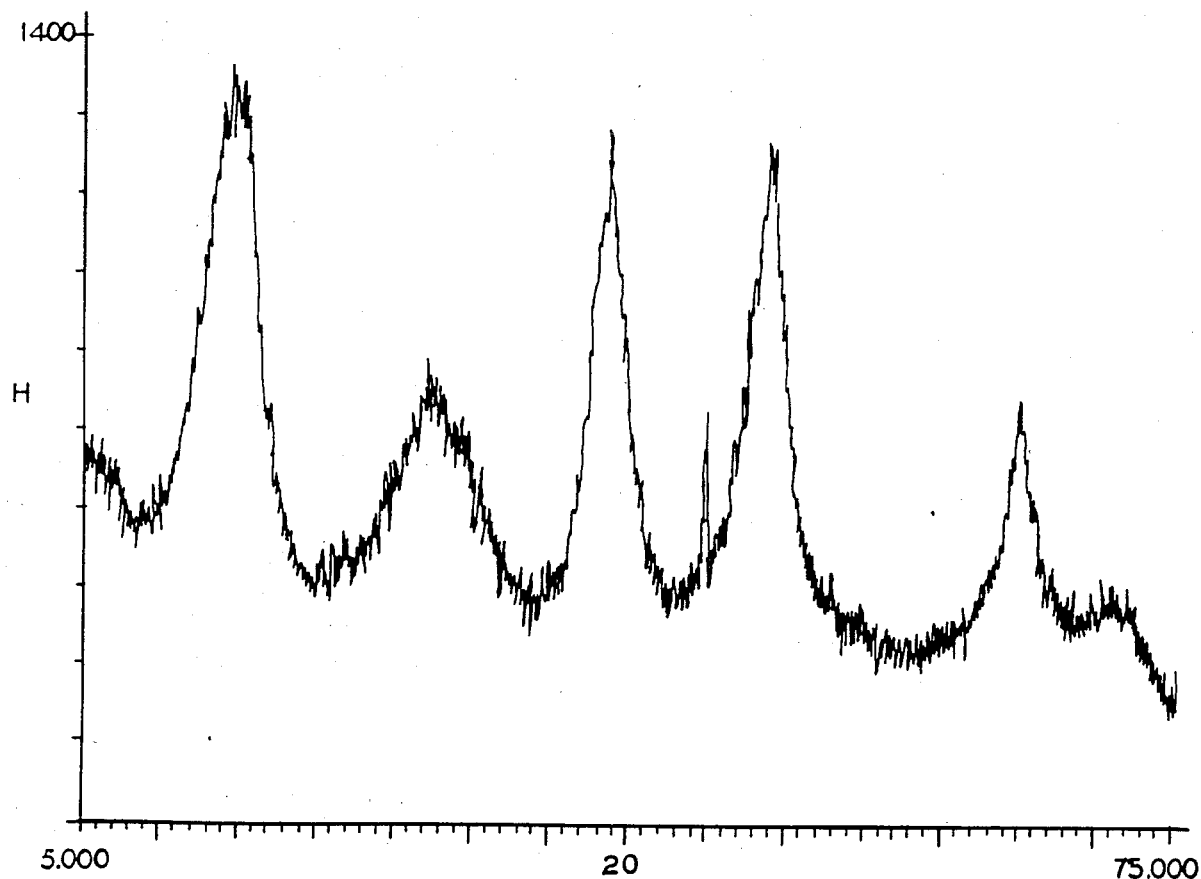
FIG. 3 is a graph of the X-ray diffraction spectra of the psudoboehmite alumina carrier used in the present invention.

First the XRD of our support ($Al_2O_3$ pseudoboehmite) is shown in FIG. 3. The cystallinity is higher than 25% as compared with well crystallized $Al_2O_3$.

In the following table the bulk and superficial composition of active metals are depicted. Total compositions are determined using atomic absorption technique. Surface compositions were determined using photoelectron spectroscopy which is able to measure the kinetic energy of the elecrons ejected from the external layer of the surface of the compound (for detail see Ref. Patterson et al.). It is the surface composition and properties of the catalyst of the present invention which are responsible for the reaction and conversion characteristics.

TABLE VI

| | SURFACE/BULK COMPOSITION | | |
|---|---|---|---|
| | CATALYST 1 | CATALYST 2 | CATALYST 3 |
| Mo | 1 | 0.23 | 0.91 |
| Ni | 2.2 | 0.99 | 0.78 |
| Si | — | 0.74 | 1.98 |
| P | 1.2 | — | 0.41 |
| S | | | |

There is more surface $SiO_2$ exposed in our catalyst (Catalyst 3) in comparison to the conventional catalyst (Catalyst 2).

Figure 4:
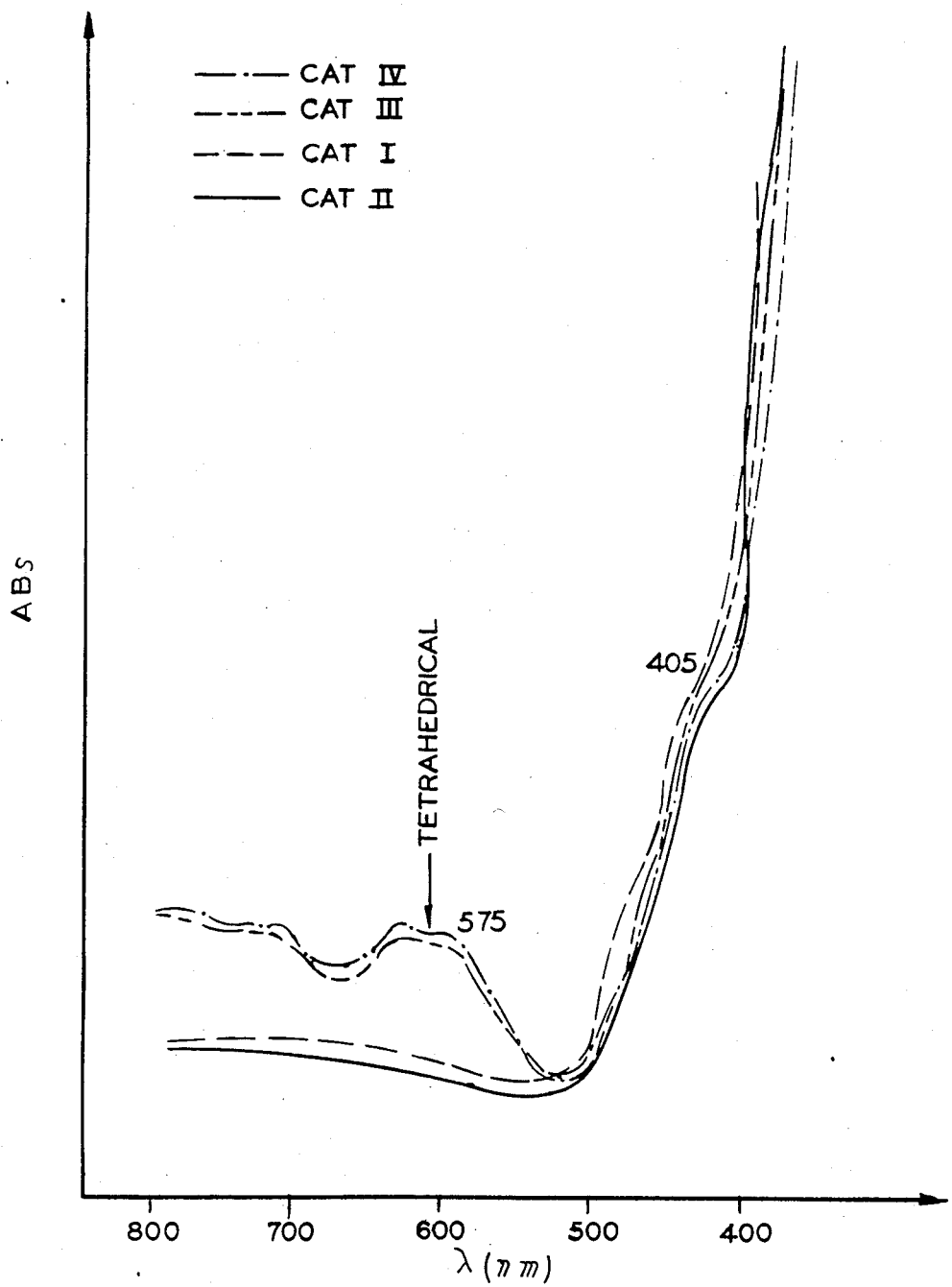
FIG. 4 is a graph of the diffuse reflectance spectroscopy for the two catalysts of the present invention as compared with two prior art catalysts.

The nickel on the catalysts could be deposited on tetrahedrical or an octahedric sites of the support. The amount of tetrahedral sites could be measured using the 575 nm adsorption bands which could be determined using a diffraction reflectance spectroscopy apparatus. Catalyst III and catalyst IV, the catalysts of the present invention, present bands which are characteristic of tetrahedral nickel. The spectra for the four catalysts considered are presented in FIG. 4.

Figure 5:
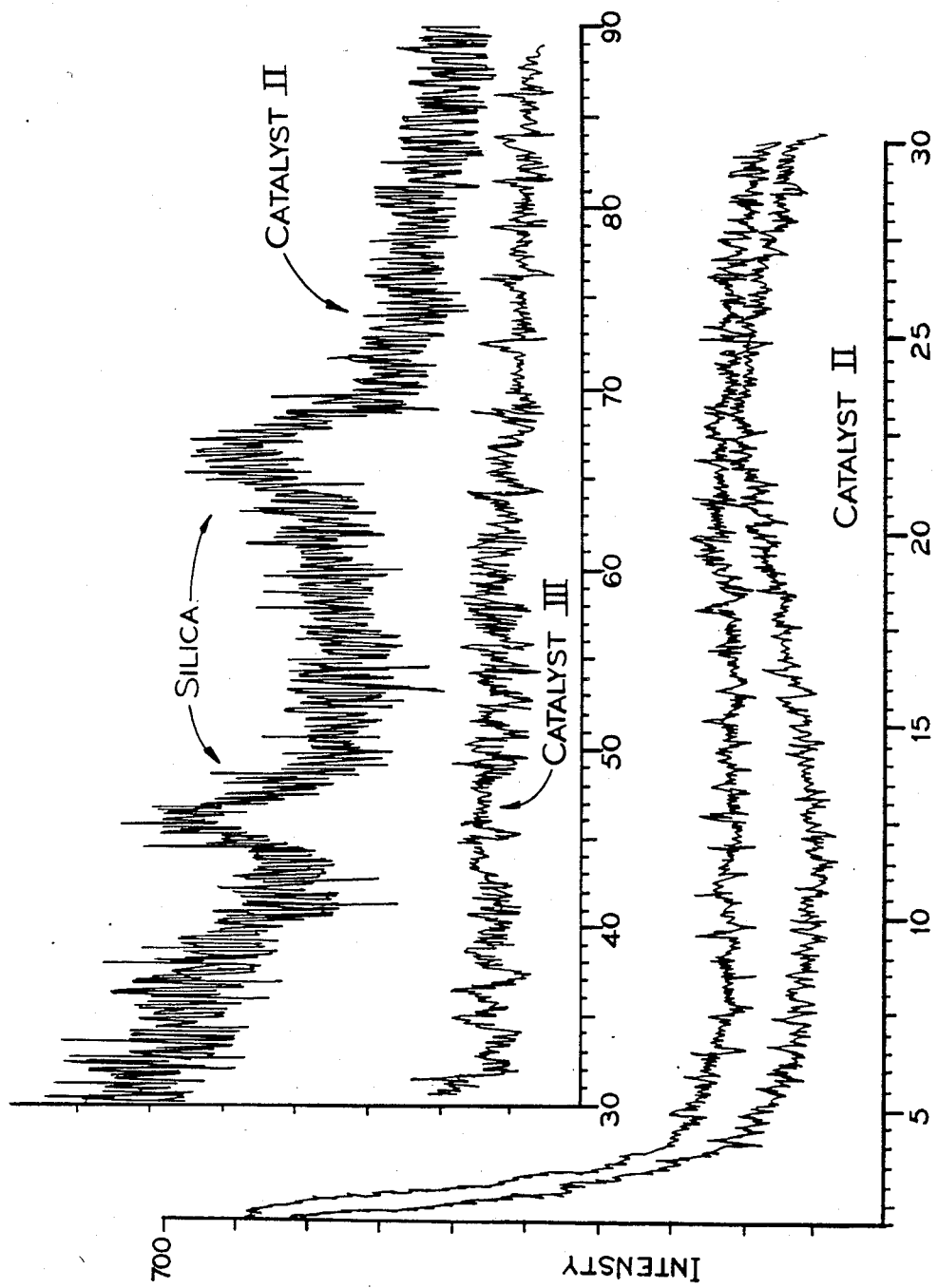
FIG. 5 is an X-ray diffraction spectra demonstrating no silica crystalline structure of the catalyst of the present invention as compared to the prior art.

Silica is presented in most of the silica-alumina catalyst in well organized crystalline structure providing typical X-ray diffraction spectra. FIG. 5 teaches about the difference between our invention and those of competing catalysts. The silica incorporated in the catalyst of the present invention, Catalyst III is compared with the prior art silica-alumina catalyst, Catalyst II. As can be seen from FIG. 5, the catalyst of the present invention produces no crystalline silica compounds as compared with the prior art.

These characteristics, surface composition, amount of tetrahedral nickel and no crystalline silica structure, and acidity indicate clearly a large difference between the catalyst of the present invention and known catalysts which contains different amounts of compound in surface for nearly the same amount of total metal content. In the same way our catalyst contains higher amounts of tetrahedral nickel compounds and less silica crystalline structure. In addition our catalyst shows different acidity measured by ammonia adsorption to 250° C.

TABLE VII

| | CATALYST 1 | CATALYST 2 | CATALYST 3 |
|---|---|---|---|
| Ammonia adsorbed mol × $10^{-6}$/$gm^2$ 250° C. | 4.5 | 3.9 | 6.26 |

Figure 6:
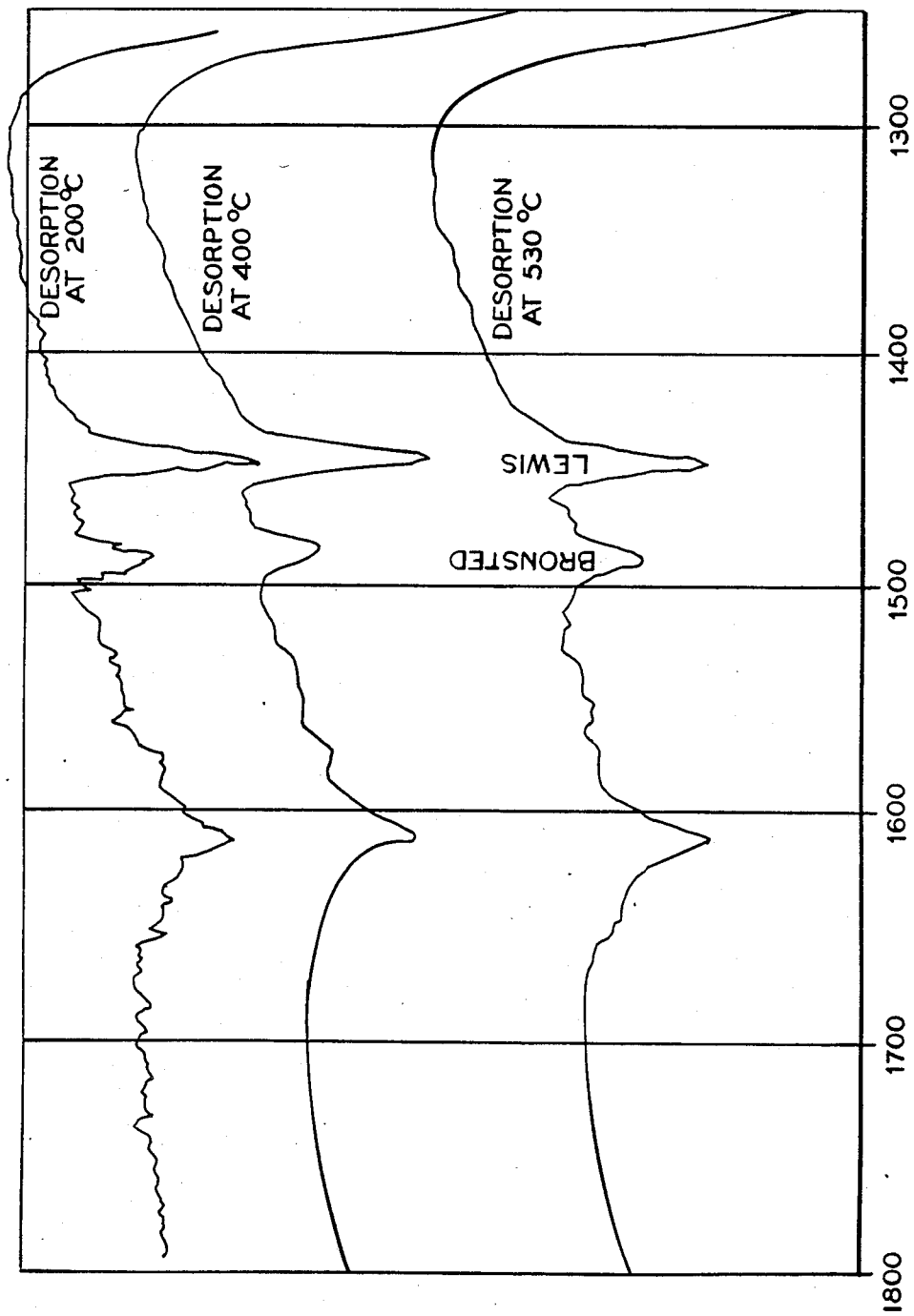
FIG. 6 illustrates the results of a pyridine adsorption test indicating the ratio of Bronsted to Lewis centers of a prior art catalyst.

Using pyridine adsorption technique for characterization of the Bronsted-Lewis ratio is possible to identify more the difference between our invention and those of commercial catalysts. In FIGS. 6 and 7 it is shown the infrared spectra for Catalyst 1 and Catalyst 3 of the remaining adsorbed pyridine which present the typical bands at 1490 $cm^{-1}$ assigned to Bronsted type and 1440 $cm^{-1}$ attributed to a Lewis type. In FIG. 6 is shown the spectra for Catalyst I an XY zeolite where the Bronsted and Lewis ratio is the highest. A comparison with FIG. 7 shows that our catalysts present higher ratio Bronsted/Lewis than competing catalysts, but lower in intensity than zeolite type catalyst for all the temperatures of desorption (200°, 400° and 500° C.), indicating a more acidic surface where there is lower interaction of Ni and Mo with the acid cites of the silica-alumina surface and higher hydrogenating capacity should be expected.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for producing a catalyst for use in the hydrocracking of a heavy hydrocarbon feedstock so as to increase cracking activity and obtain high quality middle distillate products boiling in the range of about between 300° F. to 700° F. comprising the steps of:
providing an alumina carrier; and
contacting said alumina carrier with (1) at least one component selected from the metallic elements of Group VIB of the Periodic Table so as to obtain a surface concentration as measured by X-Ray Photoelectronic Spectroscopy (XPS) to give values $Xs/(Al+X)s$ of between 4 to 15 where X equals the Group VIB metal and a bulk concentration of between 2.0 to 15.0 wt. % of said element, (2) at least one component selected from the metallic elements of Group VIII of the Periodic Table so as to obtain a surface concentration as measured by X-Ray Photoelectronic Spectroscopy (XPS) to give values $Ys/(Al+Y)s$ of between 2 to 5 where Y equals the Group VIII metal and a bulk concentration of between 1.0 to 4 wt. % of said element, (3) phosphoric acid solution containing soluble organosiloxanes at a pH of between 1.5 to 3.5 so as to obtain a surface concentration as measured by X-Ray Photoelectronic Spectroscopy (XPS) to give values $Ps/(Al+P)s$ of between 0.1 to 8 and a bulk concentration of between 0.4 to 2 wt. %, and (4) silica so as to obtain a surface concentration as measured by X-ray Photoelectronic Spectroscopy (XPS) to give values between 1 to 10 and a bulk concentration of between 0.1 to 5 wt. % whereby the surface of the catalyst is characterized by a silica-alumina material having textural and crystallographic properties substantially similar to the alumina carrier.

2. A method according to claim 1 including contacting said catalyst in a gaseous stream of hydrogen and hydrogen sulfide so as to obtain a surface concentration of between 0.1 to 15 wt. % and a surface concentration as measured by X-Ray Photoelectronic Spectroscopy (XPS) to give values S/(Al+S) of between 0.1 to 0.2.

3. A method according to claim 1 wherein said alumina carrier is dried in air at a temperature below 50° C. for a period of between 1 to 24 hours at a drying rate of 0.5 kg of water per hour.

4. A method according to claim 1 including calcining the dried catalyst in air at a temperature of about 200° to 300° C. to decompose the polymers present in the surface of the catalyst for a period of between 1 to 24 hours and further drying said catalyst at a temperature of between 400° to 550° C. for a period of between 1 to 24 hours so as to adjust the balance of Bronsted to Lewis centers ratio between 1.0 and 2.5 as measured by pyridine adsorption.

5. A method according to claim 1 including sulfiding in a gaseous stream of hydrogen and hydrogen sulfide in a normal ratio of 10 to 1 at a temperature of 250° to 330° C. for a period of time between 1 to 24 hours.

* * * * *